US008680723B2

(12) United States Patent
Subramanian et al.

(10) Patent No.: US 8,680,723 B2
(45) Date of Patent: Mar. 25, 2014

(54) LINEAR ACTUATOR

(75) Inventors: Arunkumar Subramanian, Shenzhen (CN); HongTao Wang, Shenzhen (CN); JinHui Huang, Shenzhen (CN)

(73) Assignee: Johnson Electric S.A., Murten (CH)

( * ) Notice: Subject to any disclaimer, the term of this patent is extended or adjusted under 35 U.S.C. 154(b) by 62 days.

(21) Appl. No.: 13/411,264

(22) Filed: Mar. 2, 2012

(65) Prior Publication Data
US 2012/0227269 A1 Sep. 13, 2012

(30) Foreign Application Priority Data
Mar. 7, 2011 (CN) .......................... 2011 1 0055640

(51) Int. Cl.
*H02K 33/00* (2006.01)
*H02K 35/00* (2006.01)
(52) U.S. Cl.
USPC ................... 310/25; 310/14; 310/17; 310/81; 310/36; 310/12.01
(58) Field of Classification Search
USPC .......................... 310/15, 17, 81, 25, 36, 12.01
IPC ............................................... H02K 33/00,35/00
See application file for complete search history.

(56) References Cited

U.S. PATENT DOCUMENTS

| | | | |
|---|---|---|---|
| 6,559,563 B1 * | 5/2003 | Shimizu et al. | 310/12.19 |
| 6,933,630 B2 * | 8/2005 | Kraus et al. | 310/38 |
| 6,946,754 B2 | 9/2005 | Inagaki et al. | |
| 7,078,832 B2 | 7/2006 | Inagaki et al. | |
| 7,495,358 B2 * | 2/2009 | Kobayashi et al. | 310/36 |
| 7,614,856 B2 | 11/2009 | Inagaki et al. | |
| 2005/0134123 A1 * | 6/2005 | Kobayashi et al. | 310/36 |
| 2005/0212365 A1 * | 9/2005 | Kraus et al. | 310/36 |
| 2006/0145547 A1 * | 7/2006 | Kraus | 310/36 |
| 2011/0203061 A1 * | 8/2011 | Takahashi et al. | 15/22.1 |
| 2012/0146557 A1 * | 6/2012 | Pyo et al. | 318/129 |

FOREIGN PATENT DOCUMENTS

| | | | |
|---|---|---|---|
| JP | 8331827 | 12/1996 | |
| JP | 8331828 | 12/1996 | |
| JP | 2005328685 | * 11/2005 | ............. H02K 33/16 |

* cited by examiner

*Primary Examiner* — Terrance Kenerly
(74) *Attorney, Agent, or Firm* — Muncy, Geissler, Olds & Lowe, P.C.

(57) ABSTRACT

A linear actuator includes a stationary part, a movable part moveably supported by the stationary part, and at least one elastic member disposed between the movable part and the stationary part. The stationary part includes a stator core with a pair of teeth extending inwardly there from, and a winding wound on each of the teeth. The movable part disposed between the teeth includes two pairs of permanent magnetic poles respectively facing the teeth and an output shaft projecting in a first direction. When the windings are electrified, the stationary part generates a magnetic field which interacts with the permanent magnetic poles to reciprocate the movable part relative to the stationary part in a second direction perpendicular to the first direction.

13 Claims, 6 Drawing Sheets

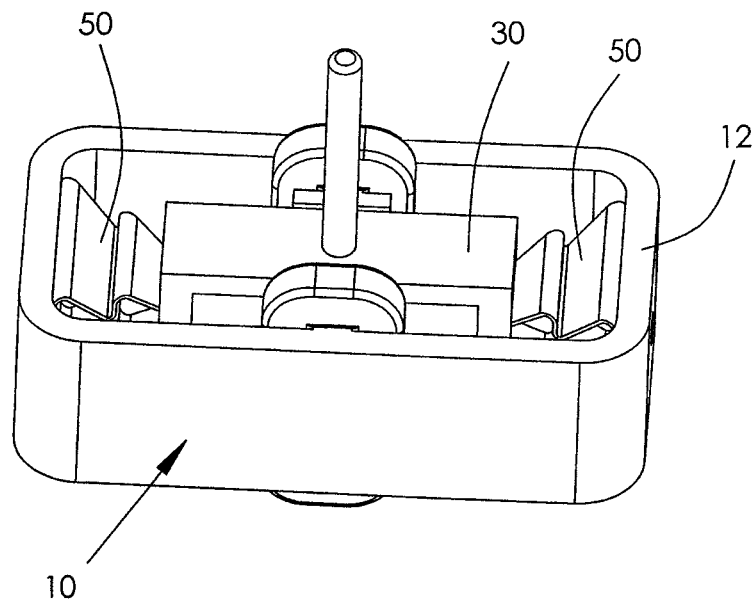
FIG. 5
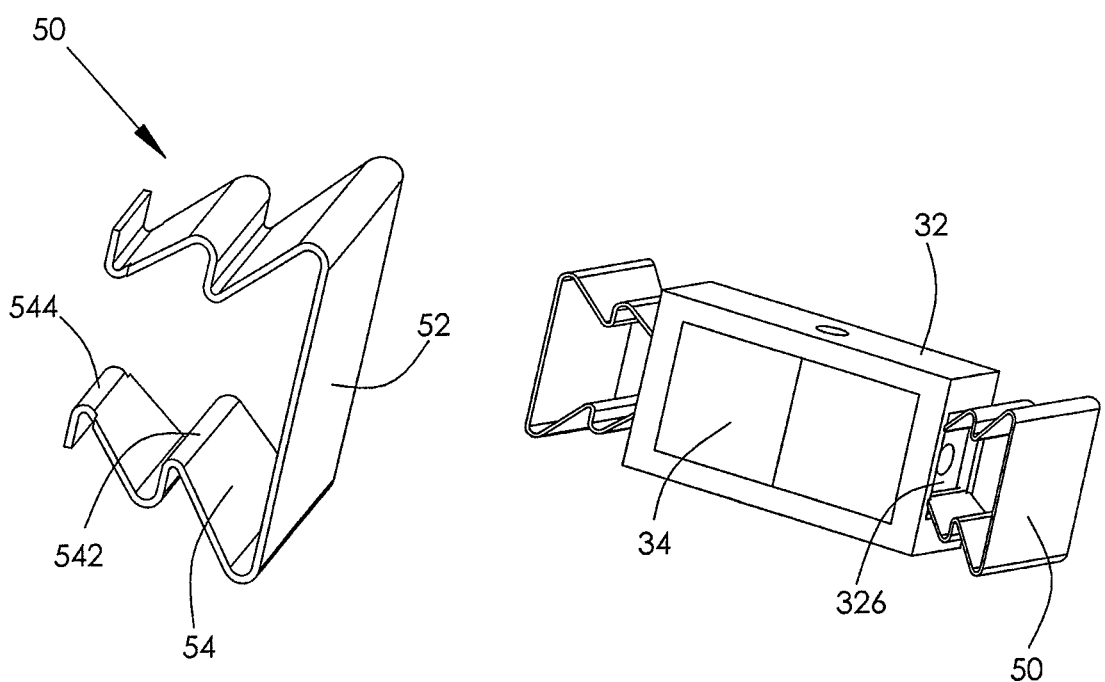
FIG. 6
FIG. 7

LINEAR ACTUATOR

CROSS REFERENCE TO RELATED APPLICATIONS

This non-provisional patent application claims priority under 35 U.S.C. §119(a) from Patent Application No. 201110055640.9 filed in The People's Republic of China on Mar. 7, 2011.

FIELD OF THE INVENTION

This invention relates to a linear actuator and in particular, to a linear actuator for a hair clipper.

BACKGROUND OF THE INVENTION

Generally, an oscillating electric motor for hair cutters comprises a stator and a mover movably supported by the stator. The stator comprises an electromagnet which comprises an E-shaped iron core with three teeth and a coil wound on the middle tooth. The mover comprises a permanent magnet with two reverse magnetic poles facing the teeth of the electromagnet. When the coils are electrified, the electromagnet generates a magnet field interacting with the permanent magnets to thereby reciprocate the mover relative to the stator in a linear path.

The present invention aims to provide a new linear actuator for hair clippers.

SUMMARY OF THE INVENTION

Accordingly, in one aspect thereof, the present invention provides a linear actuator comprising: a stationary part comprising a stator core with a pair of teeth extending inwardly there from, a winding wound on each of the teeth; a movable part moveably supported by the stationary part and disposed between the teeth, the movable part comprising two pairs of permanent magnetic poles respectively facing the teeth and an output shaft projecting in a first direction; and at least one elastic member disposed between the movable part and the stationary part; wherein when the windings are electrified, the stationary part generates a magnetic field which interacts with the permanent magnetic poles to reciprocate the movable part relative to the stationary part in a second direction perpendicular to the first direction.

Preferably, the actuator also comprises a guiding member for guiding movement of the movable part relative to the stationary part.

Preferably, the stator core comprises a ring-shaped yoke which comprises a pair of longitudinal sides and a pair of lateral sides, the teeth respectively extending from the longitudinal sides, and a pair of elastic members being respectively disposed between the movable part and the lateral sides of the yoke.

Preferably, the stator comprises two pairs of teeth each of the pairs extending from a corresponding longitudinal side of the yoke.

Preferably, the guiding member comprises a pair of guiding rods respectively extending between the lateral sides and the movable part.

Alternatively, the stator comprises a pair of T-shaped stator cores and a pair of covers respectively connecting upper and lower sides of the stator cores, the covers being made of magnetic material, one of the covers defining a guiding slot extending in the second direction, the output shaft extending through and being movable along the guiding slot.

Preferably, a pair of elastic members is respectively connected between ends of the stator cores and the movable part, each elastic member comprising a first connecting portion located at a center thereof and a pair of second connecting portions located at opposite ends thereof, the first connecting portion being fixed to the movable part, and the second connecting portions being fixed to ends of the corresponding stator core.

Preferably, the guiding member comprises at least one guiding rod extending from the movable part, a sleeve being mounted on the guiding rod and rotatably received in the guiding slot.

Alternatively, the stator comprises a pair of E-shaped stator cores and a pair of covers respectively connecting upper and lower sides of the stator cores, the covers being made of non-magnetic material, one of the covers defining a guiding slot extending in the second direction, the output shaft extending through and being movable along the guiding slot.

Preferably, the stator further comprises a pair of side walls fixed to opposite sides of the covers, a pair of elastic members is respectively connected between ends of the stator cores and the movable part, each elastic member comprising a first connecting portion located at a center thereof and a pair of second connecting portions located at opposite ends thereof, the first connecting portion being fixed to the movable part, and the second connecting portions being fixed to corresponding side walls.

Preferably, the guiding member comprises at least one guiding rod extending from the movable part, a sleeve being mounted on the guiding rod and rotatably received in the guiding slot.

According to a second aspect thereof, the present invention also provides a hair clipper comprising: a housing, a stationary cutter fixed relative to the housing, and a movable cutter being movable relative to the stationary cutter, wherein the movable cutter is driven by the output shaft of a linear actuator as described above.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

FIG. 5 illustrates a linear actuator in accordance with a second embodiment of the present invention;

FIG. 6 illustrates the elastic member of the linear actuator of FIG. 5;

FIG. 7 illustrates the support seat and magnets and elastic member of the linear actuator of FIG. 5;

DETAILED DESCRIPTION OF THE PREFERRED EMBODIMENTS

Figure 1:
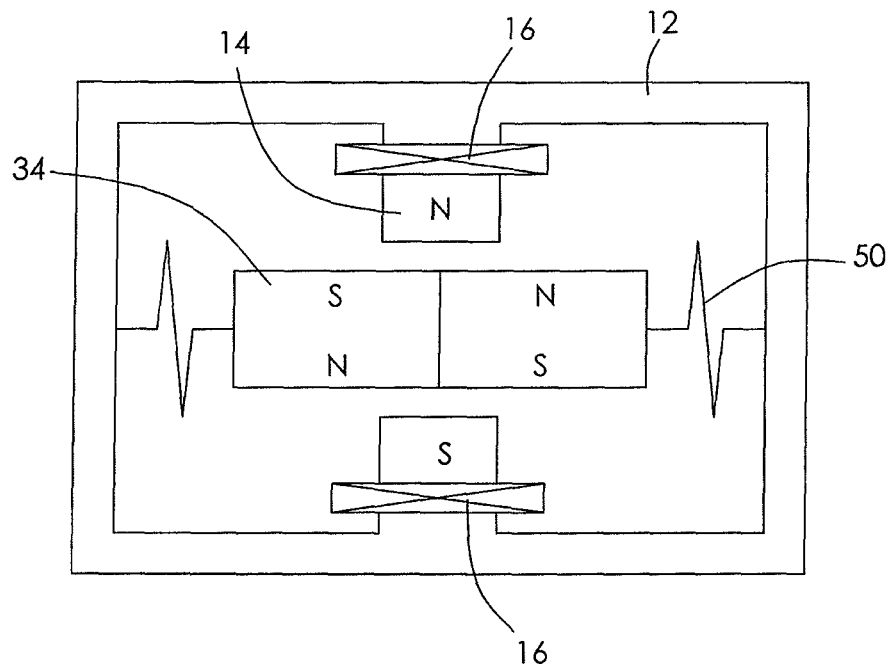
FIG. 1 is a schematic diagram of a linear actuator in accordance with a first embodiment of the present invention.
Figure 2:
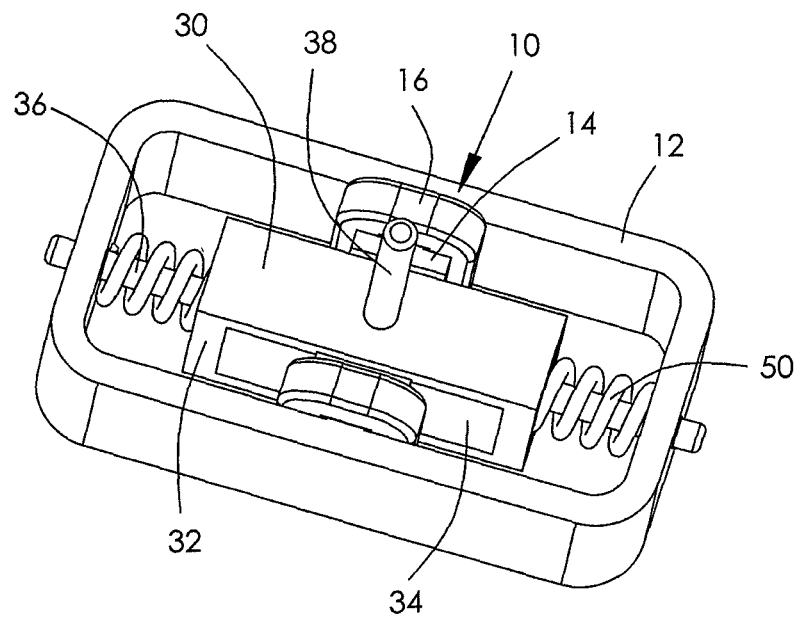
FIG. 2 is a perspective view of the linear actuator of FIG. 1.
Figure 3:
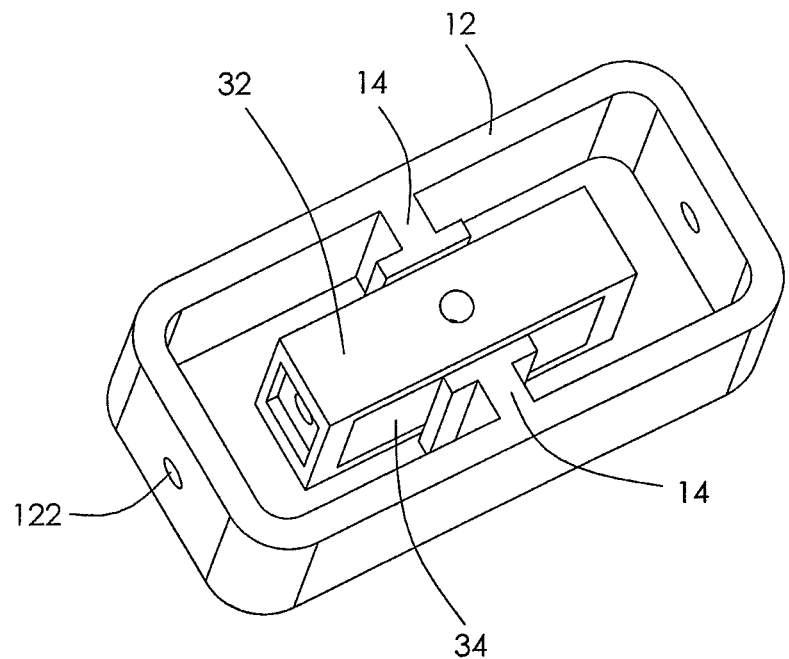
FIG. 3 illustrates the stator core, support seat and magnets of the linear actuator of FIG. 2.
Figure 4:
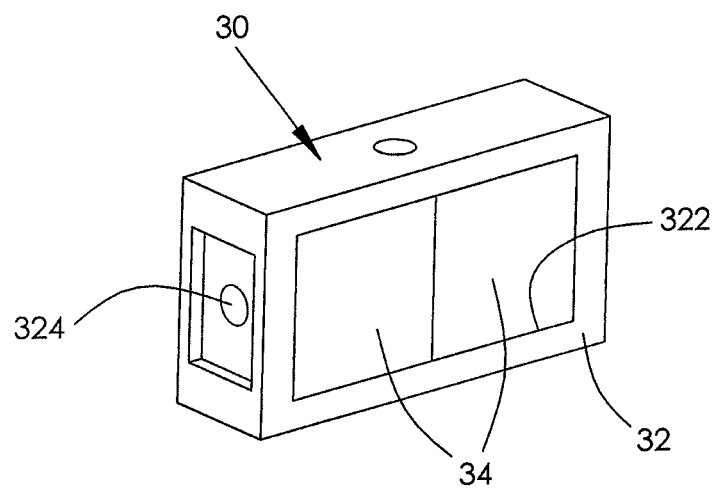
FIG. 4 illustrates the support seat and magnets of the linear actuator of FIG. 2.

The first preferred embodiment of the linear actuator of the present invention will be described with reference to FIGS. 1 to 4.

Referring to FIGS. 1-4, the linear actuator comprises a stationary part 10 and a movable part 30 moveably supported by the stationary part 10. The stationary part 10 comprises a stator core 12 made of magnetic material. The stator core 12 comprises a ring yoke and a pair of teeth 14 extending inwardly from opposite longitudinal sides of the yoke 12. A winding 16 is wound on each tooth 14.

The movable part 30 located between the teeth 14 comprises a support seat 32, and two pairs of permanent magnetic poles 34 respectively arranged at opposite sides of the support seat 32. The term 'permanent magnetic pole' refers to a magnetic pole formed by a permanent magnet. Each pair of magnetic poles 34 faces a corresponding tooth 14. In the embodiment, each of the opposite sides of the support seat 32 defines a recess 322. A permanent magnet 34 is mounted in each of the recesses 322. The magnetic poles 34 and windings 16 are arranged such that the forces acted on the magnetic poles 34 when the windings 16 are electrified have the same direction.

Alternatively, the magnetic poles 34 may be provided by a single magnet which has two faces each providing a pair magnetic poles facing a corresponding tooth 14 and winding 16.

The linear actuator further comprises a guiding member. In the embodiment, the guiding member comprises a pair of guiding rods 36 connected between lateral sides of the yoke 12 and opposite ends of the support seat 32. Specifically, each of the lateral sides of the yoke defines a mounting hole 122 and each of opposite ends of the support seat 32 defines a mounting hole 324. Opposite ends of each guiding rod 36 is mounted in the corresponding mounting holes 122, 324. The movable part 30 is reciprocated along the guiding rods 36 when the windings 16 of the stationary part 10 are electrified. A pair of elastic members 50 is arranged between opposite ends of the support seat 32 and the yoke 12. In the embodiment, the elastic member 50 is a coil spring compressed between opposite ends of the support seat 32 and the lateral sides of the yoke 12.

The movable part 30 further comprises an output shaft 38 configured to move a load. The output shaft 38 extends from the support seat 32 in a direction perpendicular to the moving direction of the movable part 30.

FIGS. 5-7 show a linear actuator in accordance with a second embodiment of the present invention. The support seat 32 defines a pair of locking openings 326 at opposite ends thereof. The elastic member 50 comprises a pair of C-shaped plate springs 50 which comprises a body 52 and a pair of arms 54 extending from ends of the body 52. Each arm 54 comprises at least one bent section 542. The distal end of the arm 54 is bent to form a locking section 544. The C-shaped plate springs 50 are respectively compressed between opposite ends of the support seat 32 and the lateral sides of the yoke 12. The bodies 52 abut against the corresponding lateral sides of the yoke 12 and the locking sections 544 are engaged in the corresponding locking openings 326.

Figure 8:
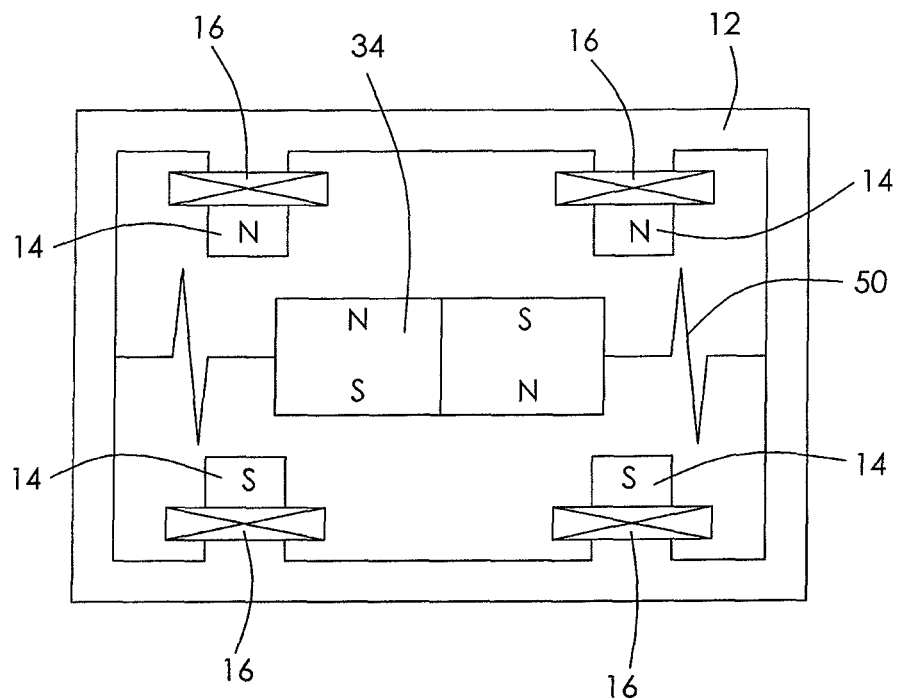
FIG. 8 is a schematic diagram of a variation of the linear actuator of FIG. 5.

Referring to FIG. 8, the stator core may comprise two pairs of teeth 14 each pair extending from a corresponding longitudinal side of the yoke 12. The teeth of each pair of teeth extend from the same longitudinal side of the yoke 12 and are polarized with the same magnetic pole when the windings 16 are electrified.

Figure 9:
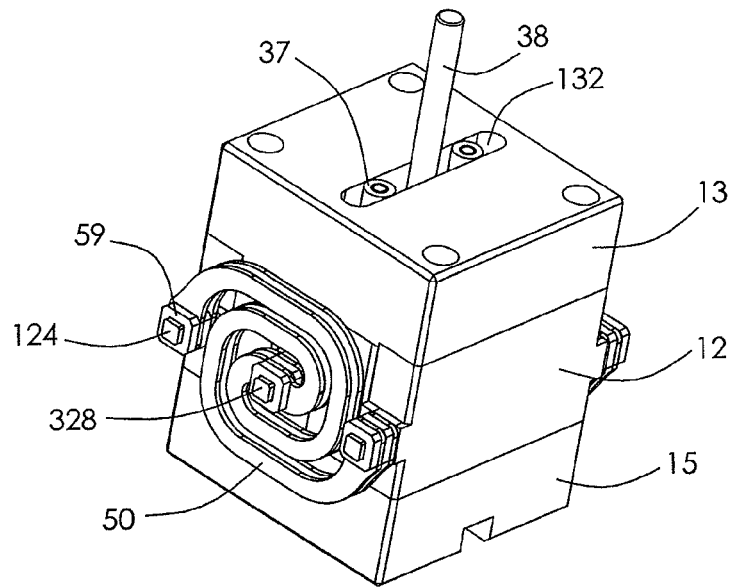
FIG. 9 is an assembled view of a linear actuator in accordance with a third embodiment of the present invention.
Figure 10:
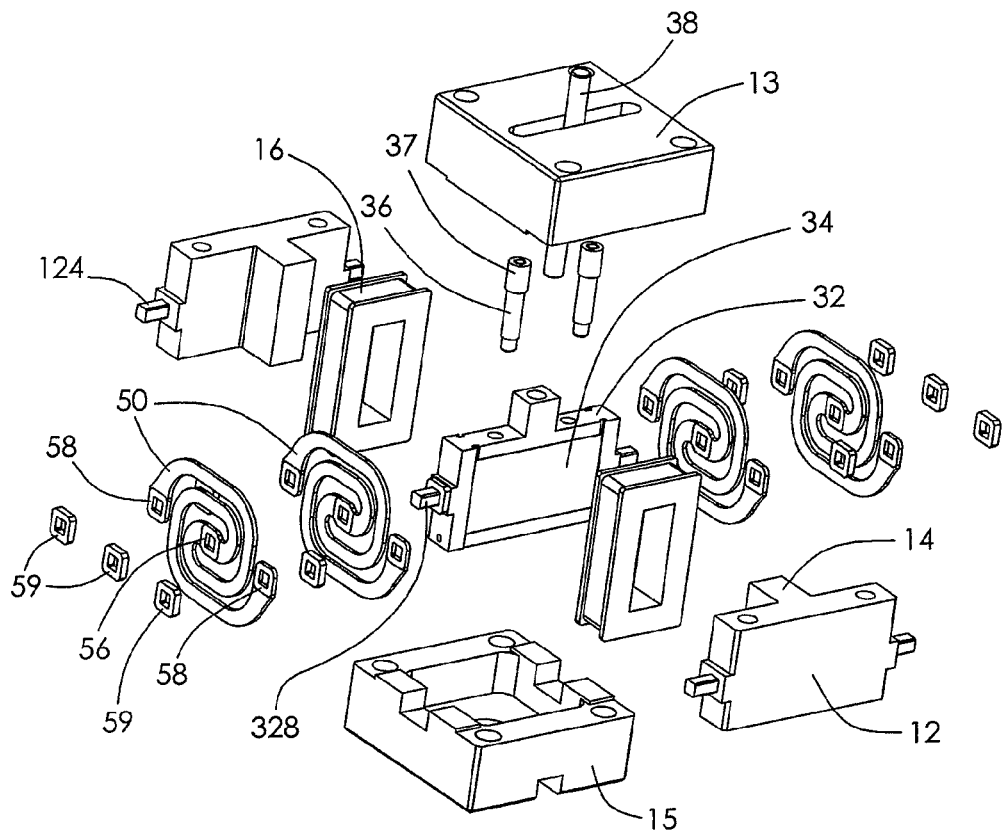
FIG. 10 is an exploded view of the linear actuator of FIG. 9.

FIGS. 9 & 10 show a linear actuator in accordance with a third embodiment of the present invention. The stator of the linear actuator comprises a pair of T-shaped stator cores 12 and a pair of covers 13, 15 respectively connecting upper and lower sides of the stator cores 12. The covers are made of magnetic material. One of the covers 13 defines a guiding slot 132. The output shaft 38 extends through and is movable along the guiding slot 132. The guiding member comprises a pair of guiding rods 36 extending from the support seat 32. A sleeve 37 is mounted on the guiding rod 36 and rotatably received in the guiding slot 132.

A pair of elastic members 50 is connected between each end of the support seat 32 and corresponding ends of the stator cores 12. Each elastic member 50 comprises a first connecting portion 56 located at a center thereof and a pair of second connecting portions 58 located at opposite ends thereof. A plurality of bent sections is formed between the first connecting portion 56 and the second connecting portion 58. The first connecting portion 56 is fixed to the end of the support seat 32 by a locking tab 59 and the second connecting portions 58 are fixed to the corresponding ends of stator core 12 by locking tabs 59. Specifically, each end of the stator core 12 and support seat 32 has a post 124, 328 protruding there from, and the connecting portions 56, 58 each defines an opening for extension of a corresponding post 124, 328. The locking tabs 59 are fixed on the corresponding posts 124, 328 by a press fit after the posts 124, 328 extend through the openings of the connecting portions 56, 58.

Figure 11:
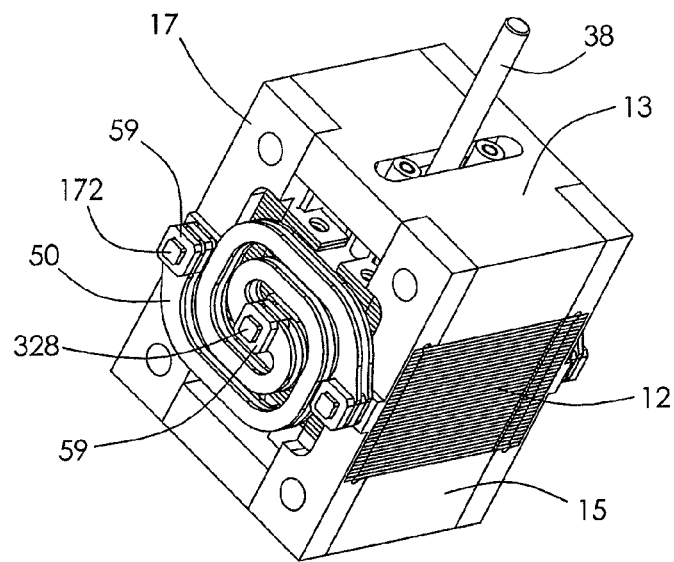
FIG. 11 is an assembled view of a linear actuator in accordance with a fourth embodiment of the present invention.
Figure 12:
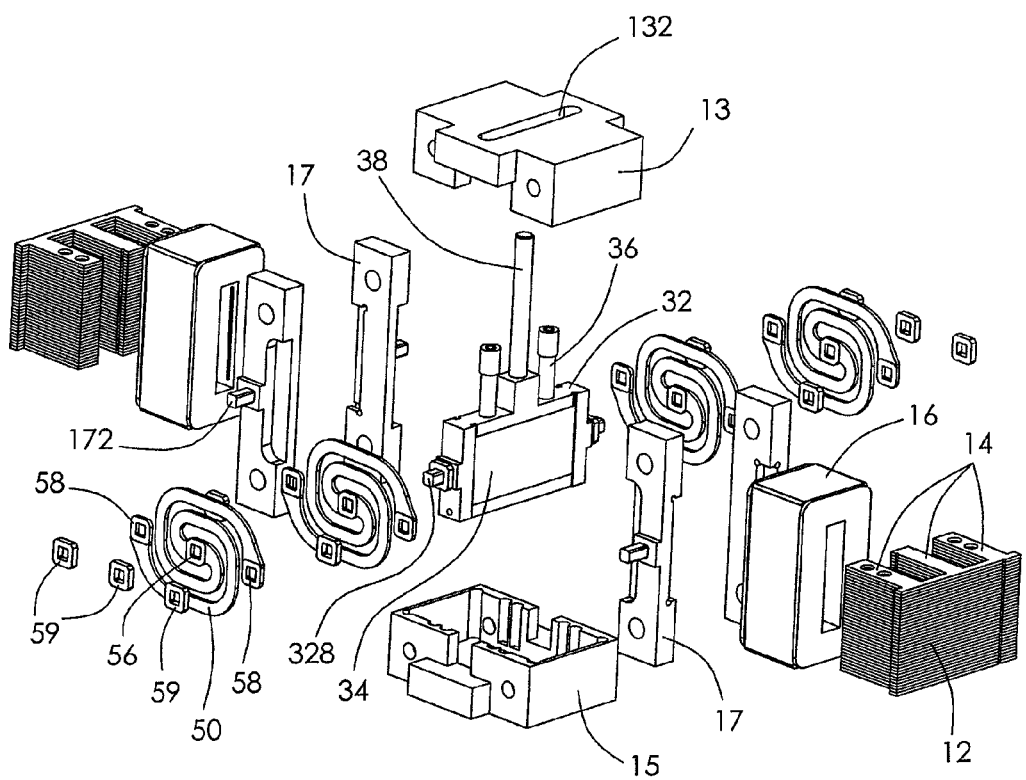
FIG. 12 is an exploded view of the linear actuator of FIG. 11.

FIGS. 11 & 12 show a linear actuator in accordance with a fourth embodiment of the present invention. The linear actuator of this embodiment is similar to that of the third embodiment except the following differences.

The stator comprises a pair of E-shaped stator cores 12 each having three teeth 14 extending toward the magnetic poles 34 of the movable part 30. The windings 16 are respectively wound on the middle ones of the teeth 14. The covers 13, 15, respectively connecting upper and lower sides of the stator cores 12, are made of nonmagnetic material. Two side walls 17 are fixed to opposite sides of the covers 13, 15. Each side wall 17 comprises two spaced halves, each having a post 172 protruding there from. Each elastic member 50 is located between the halves of a side wall 17. The first connecting portions 56 of the elastic members 50 are fixed to the posts 328 of the support seat 32 by a locking tab 59 and the second connecting portions 58 are fixed to the corresponding posts 172 of the side walls 17 by locking tabs 59.

Figure 13:
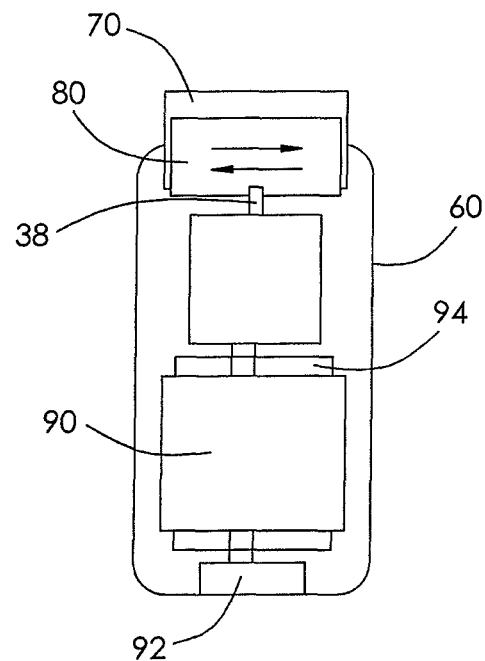
FIG. 13 illustrates a hair clipper of the present invention.

FIG. 13 shows a hair clipper using one of the above described linear actuators. The hair clipper comprises a housing 60, a stationary cutter 70, a movable cutter 80 driven by the output shaft 38 of the linear actuator, and a control circuit 90 configured to control the linear actuator. The control circuit 90 is connected to an electric connector 92 which is configured to connect to a power source. The hair clipper further comprises a rechargeable battery 94 such that the hair clipper may be used where no power is supplied. A power switch and a speed adjusting device (not shown) may be provided on the housing 60.

In the description and claims of the present application, each of the verbs "comprise", "include", "contain" and "have", and variations thereof, are used in an inclusive sense, to specify the presence of the stated item but not to exclude the presence of additional items. Terms "upper" and "lower" are only for simplifying description according to the drawing and not used to limit the actual direction of the linear actuator.

Although the invention is described with reference to one or more preferred embodiments, it should be appreciated by those skilled in the art that various modifications are possible. Therefore, the scope of the invention is to be determined by reference to the claims that follow.

The invention claimed is:

1. A linear actuator comprising:
a stationary part comprising:
a stator comprising a ring-shaped yoke having a pair of longitudinal sides and a pair of lateral sides, and a pair of teeth each extending inwardly from one of the pair of longitudinal sides; and
a winding wound on one of the teeth;
a movable part moveably disposed between the pair of teeth and comprising two pairs of permanent magnetic poles each facing one of the pair of teeth and an output shaft projecting in a first direction; and
a pair of elastic members coupling the movable part to the pair of lateral sides of the yoke and configured to generate a returning force in a second direction perpendicular to the lateral sides of the yoke and parallel to the longitudinal sides of the yoke;
wherein when the windings are electrified, the stationary part generates a magnetic field which interacts with the permanent magnetic poles to reciprocate the movable part relative to the stationary part in the second direction.

2. The linear actuator of claim 1, further comprising a guiding member for guiding movement of the movable part relative to the stationary part.

3. The linear actuator of claim 1, wherein the stator comprises two pairs of teeth each of the pairs extending from a corresponding longitudinal side of the yoke.

4. The linear actuator of claim 1, wherein the guiding member comprises a pair of guiding rods respectively extending between the lateral sides and the movable part.

5. A linear actuator comprising:
a stationary part comprising a stator core with a pair of teeth extending inwardly there from, a winding wound on each of the teeth;
a movable part moveably supported by the stationary part and disposed between the teeth, the movable part comprising two pairs of permanent magnetic poles respectively facing the teeth and an output shaft projecting in a first direction; and
at least one elastic member disposed between the movable part and the stationary part;
wherein when the windings are electrified, the stationary part generates a magnetic field which interacts with the permanent magnetic poles to reciprocate the movable part relative to the stationary part in a second direction perpendicular to the first direction,
wherein the linear actuator further comprises a guiding member for guiding movement of the movable part relative to the stationary part; and
wherein the stator comprises a pair of T-shaped stator cores and a pair of covers respectively connecting upper and lower sides of the stator cores, the covers being made of magnetic material, one of the covers defining a guiding slot extending in the second direction, the output shaft extending through and being movable along the guiding slot.

6. The linear actuator of claim 5, wherein a pair of elastic members is respectively connected between ends of the stator cores and the movable part, each elastic member comprising a first connecting portion located at a center thereof and a pair of second connecting portions located at opposite ends thereof, the first connecting portion being fixed to the movable part, and the second connecting portions being fixed to ends of the corresponding stator core.

7. The linear actuator of claim 5, wherein the guiding member comprises at least one guiding rod extending from the movable part, a sleeve being mounted on the guiding rod and rotatably received in the guiding slot.

8. A linear actuator comprising:
a stationary part comprising a stator core with a pair of teeth extending inwardly there from, a winding wound on each of the teeth;
a movable part moveably supported by the stationary part and disposed between the teeth, the movable part comprising two pairs of permanent magnetic poles respectively facing the teeth and an output shaft projecting in a first direction; and
at least one elastic member disposed between the movable part and the stationary part;
wherein when the windings are electrified, the stationary part generates a magnetic field which interacts with the permanent magnetic poles to reciprocate the movable part relative to the stationary part in a second direction perpendicular to the first direction,
wherein the linear actuator further comprises a guiding member for guiding movement of the movable part relative to the stationary part; and
wherein the stator comprises a pair of E-shaped stator cores and a pair of covers respectively connecting upper and lower sides of the stator cores, the covers being made of non-magnetic material, one of the covers defining a guiding slot extending in the second direction, the output shaft extending through and being movable along the guiding slot.

9. The linear actuator of claim 8, wherein the stator further comprises a pair of side walls fixed to opposite sides of the covers, a pair of elastic members is respectively connected between ends of the stator cores and the movable part, each elastic member comprising a first connecting portion located at a center thereof and a pair of second connecting portions located at opposite ends thereof, the first connecting portion being fixed to the movable part, and the second connecting portions being fixed to corresponding side walls.

10. The linear actuator of claim 8, wherein the guiding member comprises at least one guiding rod extending from the movable part, a sleeve being mounted on the guiding rod and rotatably received in the guiding slot.

11. A hair clipper comprising:
a housing,
a stationary cutter fixed relative to the housing,
a movable cutter being movable relative to the stationary cutter, and
a linear actuator configured for driving the movable cutter to move relative to the stationary cutter, wherein the linear actuator comprises:
a stationary part comprising a stator core with a pair of teeth extending inwardly there from, a winding wound on each of the teeth;
a movable part moveably supported by the stationary part and disposed between the teeth, the movable part comprising two pairs of permanent magnetic poles respectively facing the teeth and an output shaft projecting in a first direction and connected to the movable cutter; and at least one elastic member disposed between the movable part and the stationary part;

wherein when the windings are electrified, the stationary part generates a magnetic field which interacts with the permanent magnetic poles to reciprocate the movable part relative to the stationary part in a second direction perpendicular to the first direction which results in the output shaft reciprocating the movable cutter relative to the stationary cutter; and wherein the stator core comprises a pair of spaced stator cores and a pair of covers respectively connecting upper and lower sides of the stator cores, the covers being made of non-magnetic material, one of the covers defining a guiding slot extending in the second direction, the output shaft extending through and being movable along the guiding slot.

12. The hair clipper of claim 11, wherein the stator cores are T-shaped.

13. The hair clipper of claim 11, wherein the stator cores are E-shaped.

\* \* \* \* \*